(12) United States Patent
Gerhardt et al.

(10) Patent No.: US 6,360,563 B1
(45) Date of Patent: Mar. 26, 2002

(54) PROCESS FOR THE MANUFACTURE OF QUARTZ GLASS GRANULATE

(75) Inventors: Rolf Gerhardt, Hammersbach; Rainer Köppler, Seligenstadt; Werner Ponto, Bruchköbel; Waltraud Werdecker, Hanau, all of (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days.

(21) Appl. No.: 09/636,148

(22) Filed: Aug. 10, 2000

(30) Foreign Application Priority Data

Aug. 13, 1999 (DE) ............................................ 199 37 861

(51) Int. Cl.$^7$ ............................ C03B 9/00; C03B 23/00
(52) U.S. Cl. .......................... 65/21.1; 65/21.4; 65/30.1; 65/32.1; 65/120
(58) Field of Search ................................ 65/21.1, 30.1, 65/32.1, 21.4, 120

(56) References Cited

U.S. PATENT DOCUMENTS

| | | | |
|---|---|---|---|
| 3,341,314 A | | 9/1967 | Vukasovich et al. |
| 4,098,595 A | * | 7/1978 | Lenz et al. ................ 65/17 |
| 4,853,198 A | * | 8/1989 | Oril et al. ................ 423/335 |
| 5,063,179 A | * | 11/1991 | Menashi et al. ............... 501/12 |
| 5,611,833 A | | 3/1997 | Brahmbhatt et al. ......... 65/21.3 |
| 5,881,090 A | | 3/1999 | Yamamoto et al. ........... 373/27 |

FOREIGN PATENT DOCUMENTS

| | | |
|---|---|---|
| DE | 1596703 | 4/1971 |
| EP | 0 389 128 A2 | 9/1990 |
| FR | 780.527 | 4/1935 |
| GB | 2 083 806 A | 3/1982 |
| GB | 2176774 A | 1/1987 |
| WO | WO 88/03914 | 6/1988 |
| WO | WO 97/16384 | 5/1997 |

OTHER PUBLICATIONS

Patent Abstracts of Japan, vol. 199, No. 12, Oct. 29, 1999 for JP 11 199219A of Jul. 7, 1999.

* cited by examiner

*Primary Examiner*—Christopher A. Fiorilla
(74) *Attorney, Agent, or Firm*—Andrew L. Tiajoloff

(57) ABSTRACT

In a process for manufacture of dense, amorphous quartz glass granulate by production of a porous granulate from amorphous $SiO_2$ powder and vitrification of the granulate, a porous $SiO_2$ granulate is exposed to a fuel gas flame and is finely dispersed, heated and vitrified therein. The fuel gas flame is more flexible as concerns adjustment of the temperature than in known processes. It is in particular possible to set higher temperatures. The granulate can be exposed to very high sintering temperatures in the fuel gas flame without sintering into agglomerates. At the same time, heat resistance problems of sintering containers such as furnaces and melting pots are avoided. In addition, contamination of the $SiO_2$ granulate by contact with the walls of sintering or vitrifying containers is eliminated. The process makes it possible to economically produce a highly pure and dense quartz glass granulate.

26 Claims, 1 Drawing Sheet

PROCESS FOR THE MANUFACTURE OF QUARTZ GLASS GRANULATE

FIELD OF THE INVENTION

The invention concerns a process for the manufacture of dense amorphous quartz glass granulate by producing a porous granulate from $SiO_2$ powder and vitrifying the granulate.

BACKGROUND OF THE INVENTION

Amorphous $SiO_2$ powder is obtainable for example by flame hydrolysis or oxidation of silicic compounds, by hydrolysis of organic silica compounds by the so-called sol-gel process or by hydrolysis of inorganic silica compounds in a liquid. For example, amorphous $SiO_2$ powder having a high specific surface area ranging from 40 $m^2/g$ to about 400 $m^2/g$ is obtained in large quantities as a byproduct during the production of synthetic quartz glass for optical wave guides. However, re-use of the powder by melting is problematic. Due to their low apparent density the powders cannot be melted directly into transparent low-bubble quartz glass bodies. Wet granulation processes are for example commonly used to increase the density of the powder, whereby an agglomeration in form of porous granulate is produced from aqueous colloidal dispersion of such $SiO_2$ powders by constant mixing or agitation while moisture is gradually being removed.

In a first process of this kind according to DE A1 44 24 044 it is proposed to treat an aqueous suspension of pyrogenuously produced silicic acid powder in a mixing container with rotating agitators whose rotational velocity during a first mixing phase is set at between 15 and 30 m/s and in a second mixing phase at 30 m/s or more. A coarse granulate mass is obtained after the first mixing phase. The degree of density of the said mass is increased by addition of silicic acid powder and in a second mixing phase the coarse mass is reduced by intensive mixing and beating. Water emerges on the surface of the granular mass, and gluing of the granulate is prevented by addition of more silicic acid powder. The porous and pourable $SiO_2$ obtained in this fashion is then dried and sintered at 1000° C. to 1200° C. for solidification.

U.S. Pat. No. 5,604,163 describes a process for the manufacture of powder from synthetic quartz glass of the kind described initially. A gel produced according to the sol-gel method from tetramethoxysilane and water is rapidly dried in vacuum whereupon it breaks up while forming $SiO_2$ granulate. The granulate having a particle size ranging between 100 $\mu$m and 500 $\mu$m is then placed in a sintering container of quartz glass and heated up in batches in an electric furnace at a rate of 200° C./hr to a temperature of 1150° C. and kept at that temperature for 35 hours. The quartz glass granulate obtained in this manner can be then used for quartz glass products by conventional methods such as the Verneuil method.

A pore-free quartz glass granulate is preferable in order to avoid bubble formation during melting. However, the quartz glass granulate obtained according to the known process may contain gas residues which result in bubble formation. Reduction of residual gases by longer sintering or higher sintering temperatures leads to increased time requirements and higher cost. In addition, higher sintering temperatures also encounter limits because granulate particles soften at higher temperatures and agglomerate into an undefined porous quartz glass mass.

Especially at high temperatures the quartz glass granulate may be contaminated by the material of the sintering container. Even though the risk of contamination can be reduced by the use of suitable containers, made for example of highly pure quartz glass, such containers are costly. In addition, sintering containers of quartz glass are not suitable for temperatures above about 1400° C.

SUMMARY OF THE INVENTION

The object of the invention is therefore to provide an economical process for the manufacture of dense, highly pure quartz glass granulates.

The object is achieved on the basis of the process described initially in that the porous granulate is finely dispersed in a fuel gas flame and is vitrified in the fuel gas flame.

The term 'granulate' is understood to mean opaque pore-covered $SiO_2$ granules which are composed of a plurality of primary particles; by contrast, vitrified granulates are transparent pore-free $SiO_2$ granules having an amorphous structure.

In the process according to the invention the porous $SiO_2$ granulate is exposed to a fuel gas flame and is finely dispersed, heated and vitrified therein. The fuel gas flame is more flexible as concerns temperature than in the known process, and especially the fuel gas flame permits higher temperatures. The granulate can be exposed to very high sintering temperatures in the fuel gas flame without sintering into agglomerates. At the same time any problems linked to sintering containers such as furnaces or melting pots, are avoided. In addition, contamination of the $SiO_2$ granulate by contact with the walls of sintering or vitrification containers is avoided.

During the passage through the fuel gas flame the pores of the granulate collapse, resulting in an amorphous and dense quartz glass granulate. High temperatures accelerate the out-diffusion of gas remnants from the porous granulate and facilitate achievement of as high a density of the quartz glass granulate as possible, reducing the required sintering time from hours to seconds.

The fuel gas flame is generated by combustion of hydrogen containing components such as hydrogen itself, or carbon hydrogen compounds such as propane or acetylene. Reaction partners may be oxygen, oxygen compounds, halogens and halogen compounds.

It is of substance that the granulate particles do not agglomerate during the vitrification. Agglomeration is prevented in that the granulate is dispersed in the flame in fine distribution and is exposed to the flame in such fine distribution. For example, the granulate may be blown into the flame, sprayed or poured in. The individual granulate particles are heated in the fuel gas flame to high temperatures within a short time period while separate from one another due to the fine dispersion so that they cannot become glued together. The fine distribution assures that all the particles are exposed to the flame evenly and, furthermore, at a particularly high temperature, and are compacted.

The process according to the invention allows a continuous manufacture of $SiO_2$ granules in that the granulate is being continuously fed into the fuel gas flame.

Particularly simple is a procedure whereby the granulate is poured into the fuel gas flame. Here the granulate is poured from above in a finely distributed form into the fuel gas flame. The direction of the flame is not of substance; it may be pointed vertical to the direction of the falling material, parallel to it or on a diagonal.

In an equally preferred procedure the granulate is supplied to the fuel gas flame in a gas stream. The gas stream can simultaneously assist in the local distribution of the granulate in the fuel gas flame by being used for whirling of the poured granulate so that individual granulate articles are carried along by the gas stream in the direction of the fuel gas flame. The gas stream may for example generate a whirling bed of the poured material and the material can be treated chemically and thermally at the same time. The gas stream can also serve as carrier for supplying the granulate to a burner, the latter also producing the fuel gas flame, in that the gas stream is charged with the granulate and fed into the burner.

In an alternative method thereto it has also been shown to be advantageous for the granulate to be fed into the fuel gas flame by means of a vacuum. In this method the granulate is suctioned into the fuel gas flame. The vacuum may be for example generated within the fuel gas burners by equipping it with a venturi jet into which the granulate is fed.

It has been shown to be advantageous to adjust the fuel gas flame to a temperature of at least 1600° C., but preferably in the range from 2000° C. to 2500° C. However, a precise measurement of the fuel gas flame temperature is difficult for, among others, the introduction of the $SiO_2$ granulate into the fuel gas flame lowers the flame temperature in dependence on the rate of granulate throughput. The fuel gas temperature is understood as the maximum temperature within the fuel gas flame without the addition of the granulate. The fuel gas flame reaches temperatures where the individual granulate particles melt completely which, depending on the type and granule characteristics of the granulate and the processing conditions can lead to a desired spherification of the $SiO_2$ granulate. However, there is danger of agglomerate formation if the softened particles are allowed to come in contact with one another or with the walls before at least the surface of the individual particles has again cooled and solidified. Of substance in this case is not just the flame temperature but also the volume of the individual particles, the duration of a particle's stay in the fuel gas flame, the cooling rate and the duration of the cooling phase before contact with a wall. However, these parameters can be optimized by an expert in the field on the basis of a few experiments. Formation of agglomerates can be also avoided by reducing the fine particle content of the granulate.

The fuel gas flame is advantageously provided with a halogen containing component. The halogen containing component serves for example to purify the granulate by reacting with contaminants in the granulate and forming volatile halogenides; to reduce the OH content of the vitrified granulate or for the adjustment of other chemical or physical characteristics of the quartz glass such as for example viscosity. Halogen containing components may be for example fluoride, chlorine, bromide, iodide, gaseous chemical compounds of these elements and mixtures of these elements and compounds. The halogen containing component may be a component of the fuel gas for the generation of the fuel gas flame. The fuel gas flame is formed in this case through an exothermic reaction of the hydrogen containing component and the halogen containing component. In this method of proceeding the $SiO_2$ granulate is at the same time produced and purified by the fuel gas flame.

It has been shown to be particularly advantageous to precompact the granulate in a sintering step before the vitrification. The precompacting may be accomplished by sintering of the granulate in the fuel gas flame, by electrical heating or by microwave energy. For example, the granulate is supplied to the fuel gas flame multiple times and in the course of the sintering step none or only partial vitrification of the granulate takes place. For example the porosity of the granulate can be adjusted such that gas residues are still able to escape. Precompacted granulate can be vitrified slower and more carefully and it results in pore free quartz glass granulate having a theoretical density.

In a preferred method of proceeding the granulate is exposed to a reactive atmosphere in a first sintering step. This thermal and chemical treatment of the porous granulate allows, in addition to the precompacting, also a chemical alteration of the granulate. For example, thermal chlorinating or oxygen treatment of the granulate allows removal of contaminants such as metallic compounds, water, OH groups and/or carbon residue, or the granulate may be charged with dopants. Advantageously, granulate of an average particle size between 50 $\mu$m and 300 $\mu$m is used. The lower limit is determined by the pourability of the granulate, the upper limit by the increase in heat energy necessary for the vitrification of the granulate due to the increasing granulate particle size.

Particularly advantageous has been the use of this process for the vitrification of granulate produced by spray granulation by means of centrifugal dispersion. Such granulate, distinguished by a comparatively small average particle size can hardly be vitrified without agglomeration when stationary vitrification methods known in the art are used. Fine glassy granulate is especially suitable as filler in sealing compounds for electronics applications.

As the starting material for the process according to the invention the granulate produced by means of spray granulation advantageously has an average particle size ranging between 5 $\mu$m and 150 $\mu$m.

As far as concerns the specific surface of the granulate as used in the process according to the invention it has been shown to be advantageous when it is in the range between 5 $m^2/g$ and 100 $m^2/g$, as measured by means of the BET (Brunauer-Emmett-Teller) method.

Depending on the intended application of the quartz glass granulate a method of proceeding is preferred where the vitrification of the porous granulate takes place under reducing conditions. In the simplest case, reducing conditions are created during the vitrification of the granulate in an oxyhydrogen flame by way of a hydrogen surplus. It has been shown that the OH content in the glassy quartz glass granulate can be reduced at least partially by tempering under higher temperatures and insofar the OH content of the quartz glass granulate can be adjusted to a certain extent.

In an equally preferred variant of the process the vitrification of the porous granulate takes place in oxidating conditions. Oxidating conditions are in the simplest case established during the vitrification of the granulate in an oxyhydrogen flame by means of an oxygen surplus. It has been shown that the OH content in the glassy quartz glass granulate is for the greatest part firmly bonded and can be removed during tempering at higher temperatures only to a small degree or not at all. This is primarily advantageous when constant characteristics of the quartz glass granulate are desired in the intended application.

The process according to the invention will be explained below in more detail by way of an example and a drawing.

DETAILED DESCRIPTION

Figure 1:
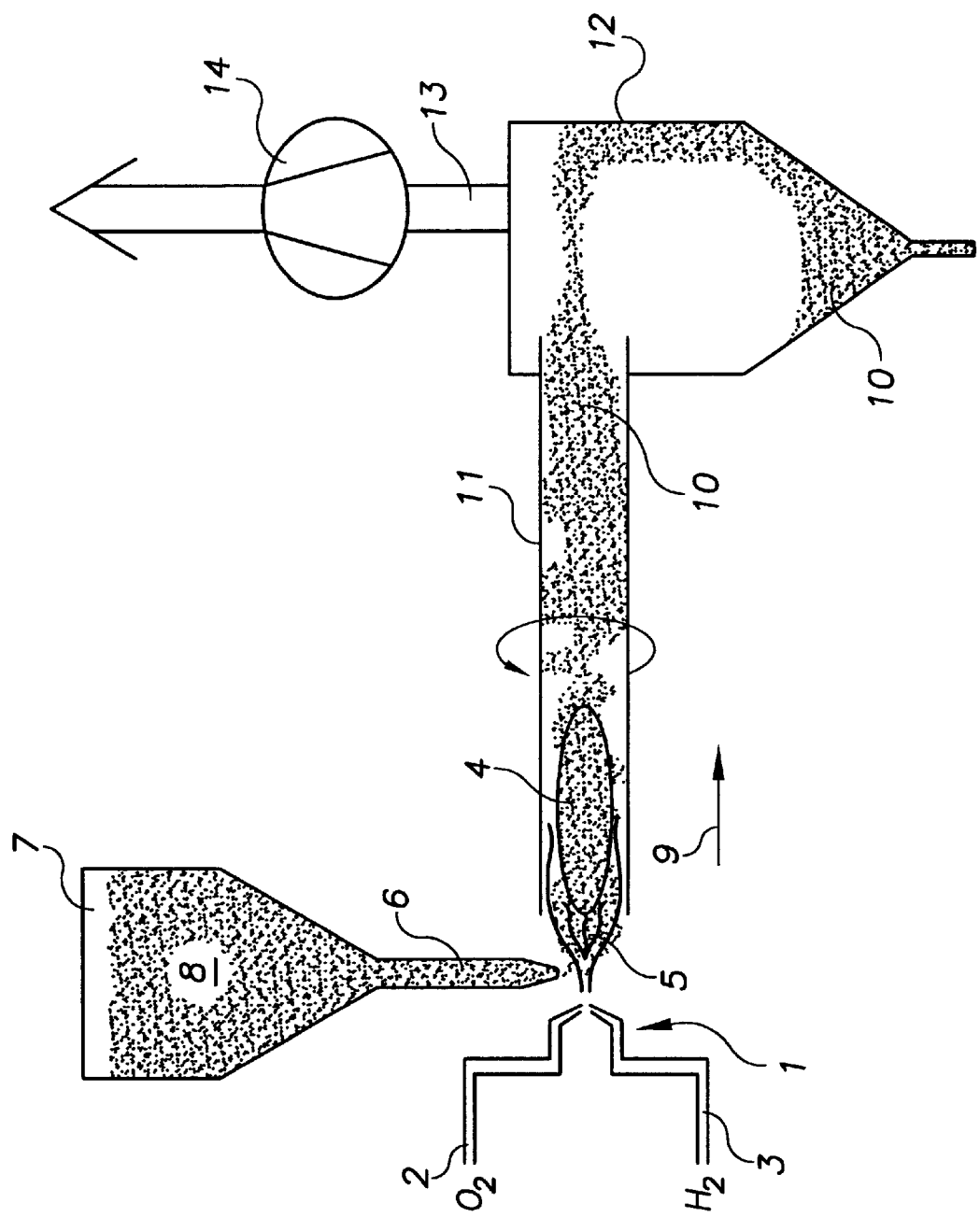
FIG. 1 shows by way of a schematic representation a device suitable for carrying out the process according to the invention.

Reference numeral 1 in FIG. 1 overall refers to an oxyhydrogen burner comprising a gas inlet 2 for oxygen and an additional gas inlet 3 for hydrogen. Hydrogen and oxygen emerge from separate burner jets from the burner 1 and react in a burner flame 5 forming $H_2O$ in an exothermic oxyhydrogen reaction. Directional arrow 9 indicates the direction of the gas flow from the burner tip. The location of the hottest region of the burner flame 5 is shown as the oval 4 in the drawing. A delivery pipe 6, connected with a storage container 7 for porous $SiO_2$ granulate 8, terminates above the flame 5. Granulate 8 is poured through the delivery pipe 6 in a direction perpendicular to the direction of the flow 9 into the burner flame 5 and is vitrified therein forming the dense quartz glass granulate 10, with the vitrification taking place substantially in the hottest region 4 of the burner flame 5. The vitrified quartz glass granulate 10 is moved by means of the fuel gas flow through the slightly inclined rotating pipe 11 of opaque quartz glass having a length of 1.8 m and an inner diameter of 80 mm to a cyclone 12 where the quartz glass granulate 10 is separated from the waste gases. A blower 14 is provided for this purpose. The device components which make contact with the granulate 8 and the quartz glass granulate 10 are made of quartz glass.

Exemplary embodiments of the process according to the invention are explained below in more detail by way of the device schematically represented in FIG. 1.

EXAMPLE 1

The following example being explained in detail is a laboratory experiment in which porous granulate 8 is vitrified in an oxy-acetylene flame. Amorphous porous $SiO_2$ granulate is poured into the burner flame 5 at a rate of 150 g/hr. The said granulate is a sifted spray granulate with a particle size of $\leq 180$ µm. The granulate 8 is continuously supplied into the burner flame 5 by means of the delivery tube 6. The individual particles of the granulate 8 are evenly distributed in the burner flame 5 because of the pouring in and they are instantly heated up. The flame temperature and geometry is altered due to the pouring in of the granulate 8; a change of the flame to a lighter color and a widening of the hot zone 4 can be perceived optically. The continues pouring in of the granulate 8 into the burner flame 5 and the fine distribution of the individual particles prevents formation of agglomerates despite the high temperature. Vitrification of the granulate 8 in the burner flame 5 takes place (in reducing conditions) in a manner of fractions of a second. Larger particles are accelerated more by the fuel gas stream than smaller particles. The length of the rotary tube 11 is chosen such that the softened quartz glass granulate 10 can cool and solidify in the rear unheated zone before coming into contact with the walls of the cyclone 12. Rotary tube 11 tangentially protrudes into cyclone 12 in which the quartz glass granulate 10 is separated from waste gases.

The quartz glass granulate 10 obtained in this manner is present in form of loose spherical particles. Yield is approximately 100% and the vitrification process results in a volume reduction of about 30% versus the loose granulate.

EXAMPLE 2

In the example explained below, reducing conditions are also set by means of the burner adjustments. However, in this case an oxyhydrogen burner is employed. Oxygen and hydrogen react in an exothermic oxyhydrogen reaction and together form the burner flame 5. A temperature of 2200° C. is found in the hottest region 4 in the exemplary embodiment. Amorphous porous $SiO_2$ granulate is poured into the burner flame 5 at a rate of 150 g/hr. In contrast to Example 1 the granulate 8 here is a sifted sprayed granulate having a particle size of $\leq 90$ µm. Vitrification of the granulate 8 takes place in accordance with the procedure described in Example 1. The vitrified fine grained quartz glass granulate tends to cling to the walls of the rotary tube 11 due to static charge. However, this can be easily prevented by the standard means of electrical charge removal. In the case of this fine grained starting material the quartz glass granulate 10 is also present in form of loose spherical particles. Yield is about 100%.

EXAMPLE 3

The example described in more detail below is a process for the vitrification of porous granulate 8 in oxidizing conditions. The oxyhydrogen burner 1 is supplied with 35 m³/hr of hydrogen and 18 m³/hr of oxygen. Oxygen and hydrogen react in an exothermic oxyhydrogen reaction and together form the burner flame 5. A temperature of over 2200° C. is found in the hottest region 4 in the exemplary embodiment. Amorphous porous $SiO_2$ granulate is poured into the burner flame 5 at a rate of 130 g/hr. The granulate 8 is obtained by the common wet granulation process. Dried granulate with a sifted particle size ranging from 90 µm to 200 µm is then used for the vitrification. In Example 3 the longitudinal axis of region 4 with the highest temperature extends parallel to the rotary tube 11 and is somewhat greater than in the preceding examples; otherwise the vitrification takes place in Example 3 in the same manner as in Example 1.

The quartz glass granulate 10 obtained in this fashion is present as an agglomerate free loose product. The yield is about 100% and a vitrification rate of 100% is achieved.

EXAMPLE 4

The example described below in more detail is a process for the vitrification of porous granulate 8 in reducing conditions. The oxyhydrogen burner 1 is supplied with 35 m³/hr of hydrogen and 14 m³/hr of a gas mixture comprising chlorine and oxygen. Hydrogen on the one hand and oxygen and chlorine on the other hand react in an exothermic oxyhydrogen or chlorine-oxyhydrogen reaction and together form the burner flame 5. A temperature of about 2100° C. is found in the hottest region 4 in the exemplary embodiment. The burner flame 5 comprises HCl and free hydrogen, in addition, reactive chlorine radicals form therein as well. Amorphous porous $SiO_2$ granulate is poured into the burner flame 5 at a rate of 300 g/hr. The granulate 8 corresponds to that described in Example 3. The vitrification process also corresponds to that described in Example 3. However, due to the chemical reaction of chlorine or chlorine compounds with the granulate 8, the hydroxyl ion content of the resulting quartz glass granulate is reduced and contaminations of the granulate 8 by solid metal oxides are converted into the corresponding volatile chlorides and are thereby removed. Reactivity of the chlorine containing components is increased by the high temperature of the burner 5. In addition, the purification effect is further increased by the fine distribution of the granulate 8 in the burner flame 5 and by the reactive chlorine radicals. The quartz glass granulate 10 obtained in this manner is distinguished by a low contaminant content of for example alkalis, alkali earths, and transition metals and is substantially free from hydroxyl ions. The vitrification rate approaches 100%.

What is claimed is:

1. A process for the manufacture of amorphous quartz glass granulate, said process comprising:

producing a porous granulate from amorphous $SiO_2$ powder;

dispersing said porous granulate in a fuel gas flame; and vitrifying the granulate in the flame.

2. The process according to claim 1, wherein the granulate is poured into the fuel gas flame.

3. The process according to claim 1, wherein the granulate is supplied into the fuel gas flame by means of a gas stream.

4. The process according to claim 1, wherein the granulate is supplied to the fuel gas flame by means of a vacuum.

5. The process according to claim 1, wherein a halogen containing component is supplied to the fuel gas flame.

6. The process according to claim 5, wherein before the vitrification the granulate is pre-compacted in a first sintering step.

7. The process according to claim 5, wherein the vitrification takes place under reducing conditions.

8. The process according to claim 5, wherein the process takes place under oxidizing conditions.

9. The process according to claim 1, wherein, before the vitrification, the granulate is pre-compacted in a first sintering step.

10. The process according to claim 9, wherein the granulate is exposed to a reactive atmosphere during the first sintering step.

11. The process according to claim 10, wherein the vitrification takes place under reducing conditions.

12. The process according to claim 10, wherein the process takes place under oxidizing conditions.

13. The process according to claim 1, wherein the granulate has an average grain size between 50 µm and 300 µm.

14. The process according to claim 13, wherein the granulate has a specific BET surface between 5 m$^2$/g and 100 m$^2$/g.

15. The process according to claim 1, wherein the granulate is produced by spray granulation.

16. The process according to claim 15, wherein the granulate has an average grain size between 5 µm and 150 µm.

17. The process according to claim 16, wherein the granulate has a specific BET surface between 5 m$^2$/g and 100 m$^2$/g.

18. The process according to claim 1, wherein the granulate has a specific BET surface between 5 m$^2$/g and 100 m$^2$/g.

19. The process according to claim 1, wherein the vitrification takes place under reducing conditions.

20. The process according to claim 1, wherein the process takes place under oxidizing conditions.

21. The process according to claim 1, wherein the fuel gas flame is set to a temperature ranging from 1600° C. to 2500° C.

22. The process according to claim 21, wherein a halogen containing component is supplied to the fuel gas flame.

23. The process according to claim 21, wherein before the vitrification the granulate is pre-compacted in a first sintering step.

24. The process according to claim 21, wherein the vitrification takes place under reducing conditions.

25. The process according to claim 21, wherein the process takes place under oxidizing conditions.

26. The process according to claim 1, wherein the fuel gas flame is set to a temperature ranging from 2000° C. to 2500° C.

* * * * *